United States Patent
Miller et al.

(10) Patent No.: US 9,256,453 B2
(45) Date of Patent: Feb. 9, 2016

(54) EXTENSIBLE WEB-BASED 3D MODELING

(71) Applicant: TRIMBLE NAVIGATION LIMITED, Sunnyvale, CA (US)

(72) Inventors: Tyler Miller, Denver, CO (US); Preston Jackson, Longmont, CO (US); Scott Lininger, Lafayette, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 276 days.

(21) Appl. No.: 13/676,298

(22) Filed: Nov. 14, 2012

(65) Prior Publication Data

US 2013/0125029 A1    May 16, 2013

Related U.S. Application Data

(60) Provisional application No. 61/559,934, filed on Nov. 15, 2011.

(51) Int. Cl.
    *G06T 19/20*      (2011.01)
    *G06F 9/455*      (2006.01)
           (Continued)

(52) U.S. Cl.
    CPC .......... *G06F 9/45529* (2013.01); *G06T 15/005* (2013.01); *G06T 17/005* (2013.01); *G06T 19/20* (2013.01); *G06F 3/04815* (2013.01)

(58) Field of Classification Search
    USPC ........................................................ 345/419
    See application file for complete search history.

(56) References Cited

U.S. PATENT DOCUMENTS 6,469,239 B1   10/2002   Fukuda
6,552,721 B1 *   4/2003   Ishikawa ....................... 345/418
(Continued)

FOREIGN PATENT DOCUMENTS

EP         2256626      12/2010
JP       2004-260274      9/2004
(Continued)

OTHER PUBLICATIONS

Berndt, René, Sven Havemann, and Dieter Fellner. "3D modeling in a web browser to formulate content-based 3D queries." Proceedings of the 14th International Conference on 3D Web Technology. ACM, 2009.*

(Continued)

*Primary Examiner* — Kee M Tung
*Assistant Examiner* — Ryan M Gray
(74) *Attorney, Agent, or Firm* — Sheridan Ross P.C.

(57) ABSTRACT

A system for extending the functionality of a web-based, three-dimensional modeling in a browser application is stored as instructions on a computer-readable medium. The instructions include an interface module that may receive user commands from the browser application that define a script including functions to modify or create a 3D model. The script instructions may cause a rendering of the 3D model to be displayed in a window controlled by the browser application. A modeling engine as a compiled browser plug-in may extends the functionality of the browser application. Further, the modeling engine may include functions to interpret model data corresponding to a 3D model and render the 3D model in accordance with the script. Further instructions include a script interface layer that may expose the modeling engine functions to the interface module for use by the script functions. The script functions extend the modeling engine functions.

20 Claims, 8 Drawing Sheets

(51) Int. Cl.
*G06T 15/00* (2011.01)
*G06T 17/00* (2006.01)
*G06F 3/0481* (2013.01)

(56) References Cited

U.S. PATENT DOCUMENTS

| | | |
|---|---|---|
| 7,827,546 B1 | 11/2010 | Jones et al. |
| 7,831,517 B1 | 11/2010 | Vijay et al. |
| 2002/0107750 A1 | 8/2002 | Kanevsky et al. |
| 2002/0154174 A1 | 10/2002 | Redlich et al. |
| 2003/0074323 A1 | 4/2003 | Catan |
| 2003/0084343 A1 | 5/2003 | Ramachandran et al. |
| 2003/0228146 A1 | 12/2003 | Fortin et al. |
| 2004/0064696 A1 | 4/2004 | Daigle et al. |
| 2004/0107085 A1 | 6/2004 | Moosburger et al. |
| 2004/0239679 A1 | 12/2004 | Ito et al. |
| 2006/0090005 A1 | 4/2006 | Wu |
| 2007/0011273 A1 | 1/2007 | Greenstein et al. |
| 2008/0015823 A1 | 1/2008 | Arnold et al. |
| 2008/0141334 A1 | 6/2008 | Wicker et al. |
| 2008/0229234 A1 | 9/2008 | Astolfi et al. |
| 2008/0281839 A1 | 11/2008 | Bevan et al. |
| 2008/0301771 A1 | 12/2008 | Kawai et al. |
| 2008/0319925 A1 | 12/2008 | Herold et al. |
| 2008/0320607 A1 | 12/2008 | Richardson |
| 2009/0276318 A1 | 11/2009 | Broadbent et al. |
| 2010/0013842 A1 | 1/2010 | Green et al. |
| 2010/0045670 A1 | 2/2010 | O'Brien et al. |
| 2010/0118039 A1 | 5/2010 | Labour |
| 2010/0135552 A1 | 6/2010 | Leib et al. |
| 2010/0257451 A1 | 10/2010 | Halevi et al. |
| 2010/0312596 A1 | 12/2010 | Saffari et al. |
| 2010/0312879 A1 | 12/2010 | Taieb |
| 2011/0057929 A1 | 3/2011 | Chen et al. |
| 2011/0078801 A1 | 3/2011 | Bae |
| 2011/0137437 A1 | 6/2011 | Jonsson |
| 2011/0214075 A1 | 9/2011 | Vongphouthone et al. |
| 2011/0231274 A1 | 9/2011 | Joao |
| 2012/0089960 A1 | 4/2012 | Medvidovic et al. |
| 2012/0331061 A1 | 12/2012 | Lininger |
| 2013/0002647 A1 | 1/2013 | Bacus et al. |
| 2013/0120378 A1 | 5/2013 | Miller et al. |
| 2013/0120770 A1 | 5/2013 | Mandel et al. |
| 2013/0124155 A1 | 5/2013 | Miller et al. |
| 2013/0124700 A1 | 5/2013 | Miller et al. |
| 2013/0202197 A1 | 8/2013 | Reeler et al. |

FOREIGN PATENT DOCUMENTS

| | | |
|---|---|---|
| KR | 10-0595506 | 7/2006 |
| KR | 10-2009-0041204 | 4/2009 |
| WO | WO 2008/157639 | 12/2008 |

OTHER PUBLICATIONS

Behr, Johannes, et al. "X3DOM: a DOM-based HTML5/X3D integration model." Proceedings of the 14th International Conference on 3D Web Technology. ACM, Jun. 2009.*

International Search Report and Written Opinion for International (PCT) Patent Application No. PCT/US2012/064890, mailed Mar. 26, 2013 9 pages.

International Preliminary Report on Patentability for International (PCT) Patent Application No. PCT/US2012/064890, mailed May 30, 2014 8 pages.

International Search Report for International (PCT) Patent Application No. PCT/US2012/64884, mailed Mar. 25, 2013 3 pages.

International Preliminary Report on Patentability for International (PCT) Patent Application No. PCT/US2012/064884, mailed May 30, 2014 8 pages.

International Search Report for International (PCT) Patent Application No. PCT/US2012/064928, mailed Mar. 22, 2013 3 pages.

International Preliminary Report on Patentability for International (PCT) Patent Application No. PCT/US2012/064928, mailed May 30, 2014 8 pages.

International Search Report for International (PCT) Patent Application No. PCT/US2012/064939, mailed Mar. 19, 2013 2 pages.

International Preliminary Report on Patentability for International (PCT) Patent Application No. PCT/US2012/064939, mailed May 30, 2014 8 pages.

Extended Search Report for European Patent Application No. 12849865.6, dated Feb. 4, 2015 6 pages.

Official Action for U.S. Appl. No. 13/676,304, mailed Dec. 17, 2014 11 pages.

Official Action for U.S. Appl. No. 13/675,770, mailed Aug. 25, 2014 26 pages.

Official Action for U.S. Appl. No. 13/675,770, mailed Jan. 22, 2015 27 pages.

Official Action for U.S. Appl. No. 13/676,335, mailed Mar. 6, 2015 56 pages.

* cited by examiner

EXTENSIBLE WEB-BASED 3D MODELING

CROSS REFERENCE TO RELATED APPLICATIONS

This application claims the benefit of U.S. Provisional Patent Application No. 61/559,934, filed on Nov. 15, 2011, entitled "Extensible Web-Based 3D Modeling," the disclosure of which is hereby expressly incorporated herein by reference.

FIELD OF THE DISCLOSURE

This disclosure relates to a system and method for developing three-dimensional models of graphical objects and, in particular, to an extensible web-based system and method for developing three-dimensional graphic objects.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, professional as well as non-professional users in a variety of different fields, such as engineering, architecture, automotive design, graphic design, advertising, fashion design, medicine, etc., can develop three-dimensional (3D) models of buildings, vehicles, and other objects using 3D modeling software that operates on a computing device. A user typically interacts with 3D modeling software via input devices such as a keyboard, mouse, trackball, and/or stylus, and the drafting document is displayed on a graphical display device, such as a computer monitor or screen.

In general, 3D modeling software allows a user to draw various three-dimensional shapes (directly or by defining two-dimensional faces that make up 3D shapes), apply colors and/or textures to the shapes, move, scale, rotate, and skew the shapes, etc. 3D modeling software typically provides the user with stock objects (e.g., 3D shapes such as spheres or parallelepipeds and/or two-dimensional (2D) shapes such as arcs, circles, rectangles, and other known geometric shapes) and/or provides tools to create such objects. Further, 3D modeling software typically allows users to save models as files that conform to a certain predefined format. To share models, users transmit to each other files with the corresponding model data, or upload the files to data servers.

Users usually develop 3D models by sequentially entering various drawing and image manipulation commands via a graphical user interface (GUI). For example, to model a two-story building, a user may first draw a four-wall structure, draw a door in one of the walls, then draw several windows in the walls, etc. The user may then paint or texture the walls, the roof, and other portions of the model. Many objects may need to be repeatedly drawn within a three-dimensional object. For the two-story building, a particular style of window may need to be drawn several times within the various floors of the building, a particular style of roof may be repeated across a wide area, shutters or other decorative structures may need to be repeatedly placed next to the windows, etc. Accordingly, it may take a significant amount of time for a user or group of users to develop a complex and detailed model that includes actions or objects that need to be repeated many times to complete the building.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In an embodiment, a tangible non-transitory computer-readable medium stores instructions for three-dimensional (3D) modeling in a browser application and executes on a processor of a computing device. The instructions may comprise an interface module that executes on the processor to receive user commands from the browser application. The commands may define a script including functions to modify or create a 3D model and cause a rendering of the 3D model to be displayed in a window controlled by the browser application. Further instructions include a modeling engine that executes on the processor as a compiled plug-in component of the browser application. The modeling engine may extend the functionality of the browser application and include functions to interpret model data corresponding to a 3D model and to render the 3D model in accordance with the script. Still further instructions include a script interface layer that executes on the processor to expose the modeling engine functions to the interface module for use by the script functions. The script functions may extend the modeling engine functions.

In a further embodiment, a computing device for extending functions of a 3D modeling system may comprise a network interface coupled to a communication network, a processor, a memory coupled to the processor, and a display device coupled to the processor. Further, a browser application stored in the memory may execute on the processor to retrieve content from remote hosts via the communications network interface and render the retrieved content on the display device. A 3D modeling software module stored in the memory may execute on the processor and include components. For example, the components may include an interface module that executes on the processor to receive user commands from the browser application. The commands may define a script including functions to modify or create a 3D model and cause a rendering of the 3D model to be displayed in a window controlled by the browser application. A modeling engine module may execute on the processor as a compiled plug-in component of the browser application. The modeling engine may extend the functionality of the browser application and include functions that cause the processor to interpret model data corresponding to a 3D model and to render the 3D model on the display device in accordance with the script. Further, a script interface layer may execute on the processor to expose the modeling engine functions to the interface module for use by the script functions. The script functions may extend the modeling engine functions.

In a still further embodiment, a method for extending functions of a browser-based, 3D modeling system in a computing device operating on a communication network and having a memory and a processor may comprise several steps. For example, the method may receive a 3D modeling engine from a backend server at a browser application. The 3D modeling engine may be received as a compiled plugin including functions to extend the functionality of the browser application and include an interface layer that exposes the 3D modeling engine functions for use by a script. The method may also receive, via a user interface of a browser application, a user command for authoring the script. The script may include instructions that refer to the 3D modeling engine functions, and the functions may modify respective portions of model data to change one or more of dimensionality, positioning, and color of a 3D model component. The method may also send the script to a backend database. The script may be executed to extend the 3D modeling engine functions.

Figure 1:
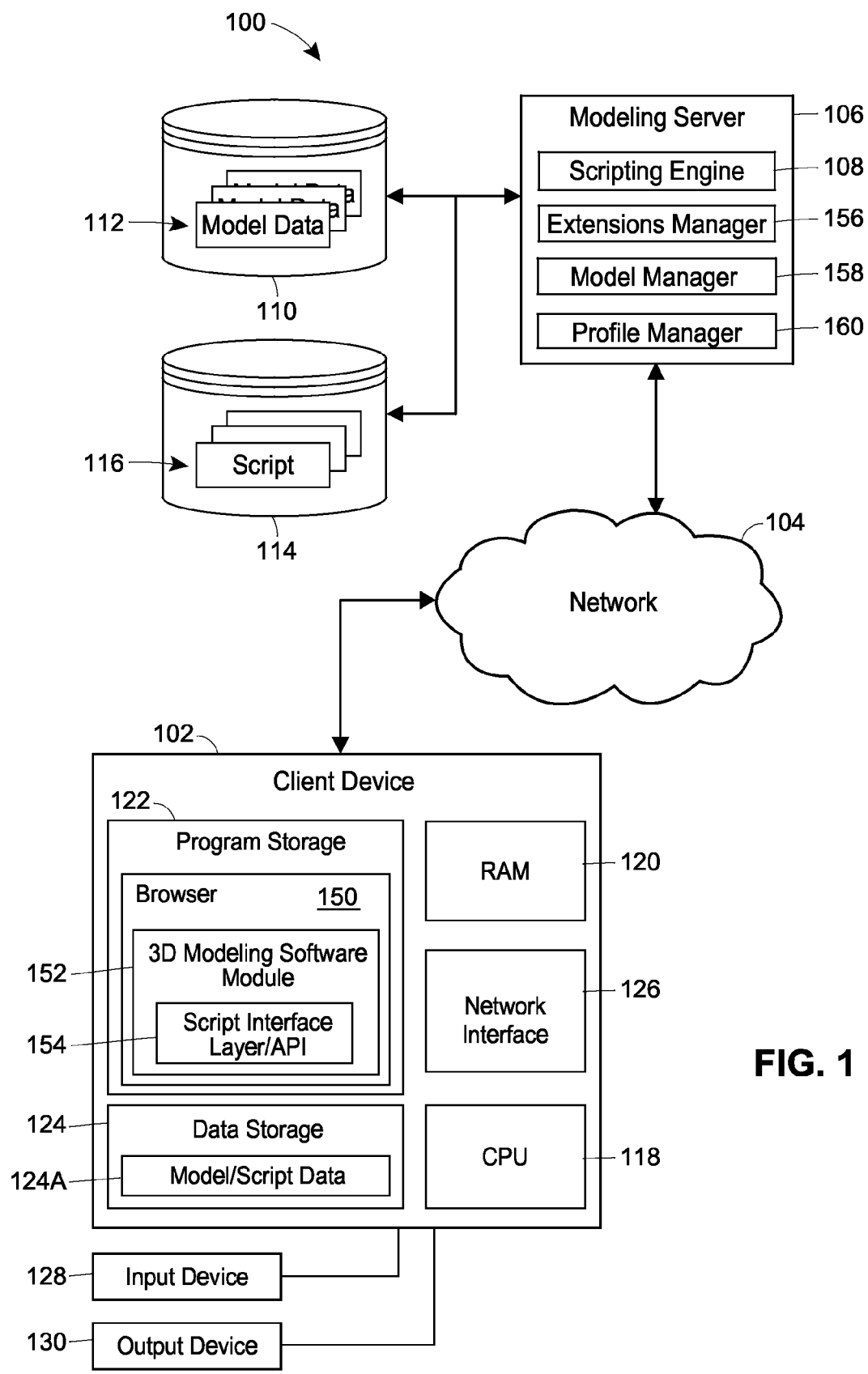
FIG. 1 is a block diagram of a communication system in which techniques of the present disclosure are utilized to allow a user operating a web-based 3D modeling system to extend the functionality of that system.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In embodiments described below, a script interface layer of a web-based, 3D modeling engine operating in a web browser application on a client device allows a user to develop additional operations to extend the functionality of the engine. The 3D modeling engine may be implemented as a browser plugin and include compiled instructions that are executable by a processor of a client device. The engine may provide functions for creating and manipulating objects in a 3D modeling environment, applying colors and textures to the shapes, etc. The script interface layer may expose functions of the engine to add scripts that are interpretable by a component of the layer to provide additional 3D modeling functions. For example, the script interface layer may expose certain classes and method within those classes to define additional operations that a user can perform within a web-based, 3D modeling user interface by accessing the classes. For example, using the script interface layer, a user may create scripts that define an icons within a toolbar of the user interface that, when selected, adds a non-standard 3D shape to the drawing.

As a browser plugin, the user can access modeling functionality without launching a separate application and, in some implementations, without installing compiled software components on the client device. The 3D modeling software module (or simply "the modeling software") generally allows the user to create and edit 3D models of buildings, vehicles, items of furniture, and other objects using various controls, provided via the browser application, for manipulating component 3D shapes and/or 2D faces, defining interactions between the components, grouping the components into composite components, etc. The modeling software also allows the user to rotate a 3D model displayed in a browser application window, change the angle and the distance of the viewpoint relative to the model, and otherwise control the manner in which the model is rendered on a user interface of the client device. The modeling software may receive user commands via the browser application for modifying the 3D model, generate a representation of the desired modifications (also referred to below as "mutations" of the model), and, when used in a collaborative environment, cause the modifications to the 3D model to be synchronized with at least one other client device (see U.S. patent application Ser. No. 13/169,705, filed Jun. 27, 2011, entitled "Collaborative Development of a Model on a Network," the entire disclosure of which is hereby expressly incorporated herein by reference). The 3D model may be stored in a computer memory as data that specifies multiple simple (e.g., cuboids, spheres) and aggregate components having groups of simple components, and modifications to the 3D model may include modifications of dimensionality, positioning, color or texture, and other properties of some or all of the components described by the model data.

To operate as a part of a web browser application, the 3D modeling software module includes components to display a user interface through a document object model (DOM) of a browser application or through a window controlled by the browser application, the networking functions of the client device on which the browser application executes, and the graphics functions provided by the browser application or an extension/plugin of the browser application. To support extensibility of the 3D modeling software, a script interface layer may be implemented as a separate, compiled software module or as part of the 3D modeling software module.

Referring to FIG. 1, techniques for extending the functionality of a web-based modeling system may be implemented in a communication system 100, for example. In an embodiment, the communication system 100 includes a client device 102 and a communication network 104 to which the client device 102 is communicatively coupled. In operation, a user operating the client device 102 develops a model of an object or a group of objects. The communication system 100 may also include a modeling server 106 in which a scripting engine 108 facilitates creating and sharing scripts during the model development process. The modeling server 106 may be coupled to the client device 102 via the communication network 106. Further, in an embodiment, the communication system 100 includes a model database 110 to store model data 112 corresponding to various 3D models and a script database 114 to store various user-defined scripts 116.

The client device 102 includes a central processing unit (CPU) 118 having one or more processors to execute computer-readable instructions, a random access memory (RAM) unit 120 to store data and instructions during operation, program storage 122 including persistent memory to store software applications, shared software components such as Dynamic-link Libraries (DLLs), and other programs executed by the CPU 118, data storage 124 including persistent memory to store data used by the programs stored in the program storage 122, and a network interface 126 to support wired and/or wireless communications with the modeling server 106 and other devices operating on the network 104. By way of example, the program storage 122 and the data storage 124 may be implemented on a hard disk drive (HDD) coupled to the CPU 118 via a bus. Generally speaking, each of the components 118, 120, 122, 124, and 126 may be implemented in any suitable manner as a single module, multiple modules, or a component of another module. Further, the memory components such as the RAM 120, the program storage 122, and the data storage 124 may include any suitable type of tangible, non-transitory computer-readable medium.

In the example implementation of FIG. 1, the client device 102 is a personal computer (PC). However, in general, the client device 102 may be any suitable stationary or portable computing device such as a tablet PC, a smart phone, etc. Although the computing device 102 in the example of FIG. 1 includes both storage and processing components, the client device 102 in other embodiments can be a so-called thin client that depends on another computing device for certain computing and/or storage functions. For example, in one such embodiment, the data storage 124 and the program storage 122 are external to the computing device 102 and are connected to the client device 102 via a network link. Further, the client device 102 may be coupled to an input device 128 and an output device 130. The input device 128 may include, for example, a pointing device such as a mouse, a keyboard, a touch screen, a trackball device, a digitizing tablet, or a microphone, and the output device 130 may include an LCD display device, a touch screen, or another suitable output device. Using the input device 128 and the output device 130, a user can access a graphical user interface (GUI) of the client device 102.

With continued reference to FIG. 1, the program storage 122 may store a browser application 150 for retrieving content from hosts operating on the network 104, interpreting and rendering the content, supporting various user interactions with the retrieved content, and providing an interface to author scripts to manipulate the content. Several examples related to browser functionality are discussed in more detail below with reference to FIGS. 2A-C. In some embodiments, the program storage 122 stores a 3D modeling software module 152 that implements a scripting interface layer 154 and executes in the browser application 150 to develop both 3D models 112 and scripts 116 to develop, format, and manipulate the 3D models. In other embodiments the modeling client 152 may be stored in the RAM 120 during runtime and not stored in persistent memory. For example, the modeling engine 152 may be downloaded from the modeling server 106 each time a user develops a 3D model at the client device 102. To this end, the modeling server 106 may include tangible, non-transitory computer-readable medium on which the instructions of the modeling client 152 and script interface layer 154 are stored.

As explained below, the modeling client 152 may include a set of compiled instructions executable directly on the CPU 118, a set of instructions stored on a computer-readable medium and interpretable by the browser application 150 at runtime to be executed on the CPU 118, or both. Generally speaking, the modeling client 152 provides a set of modeling controls to generate, position, and variously adjust three-dimensional objects, apply textures to the shapes or surfaces, define interactions between shapes, etc. Furthermore, the script interface layer 154 may expose functions and methods of the modeling engine 152 so that a user may author various scripts to create and manipulate shapes.

Figure 2A:
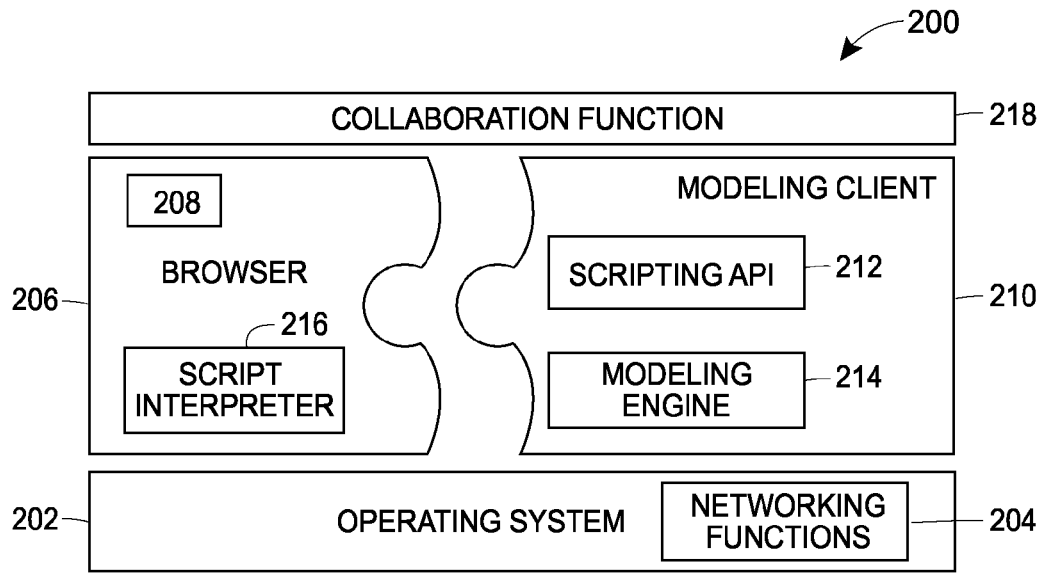
FIG. 2A is a high-level block diagram of an example computing environment implemented in a client device of FIG. 1, in which a 3D modeling software module and scripting API are provided in a browser plugin.
Figure 2B:
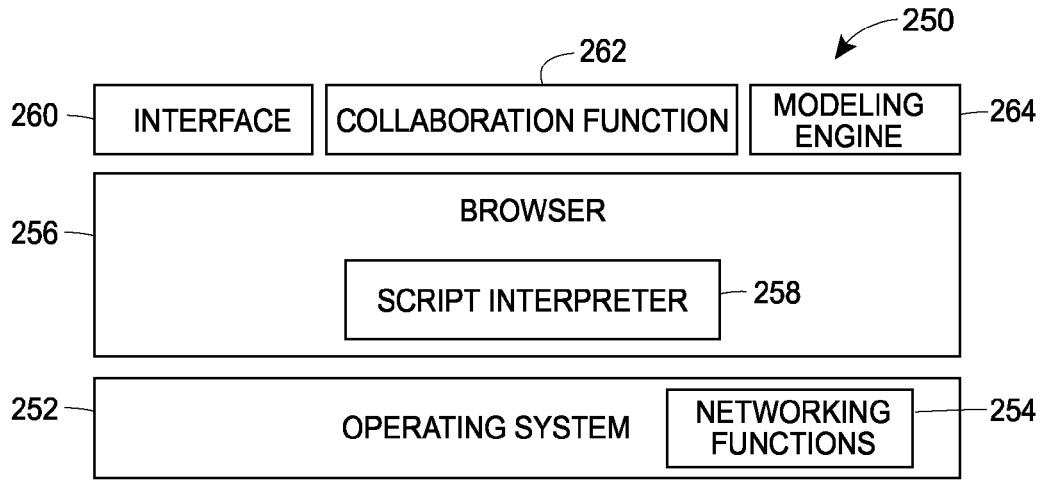
FIG. 2B is a high-level block diagram of another example computing environment that can be implemented in a client device of FIG. 1.
Figure 2C:
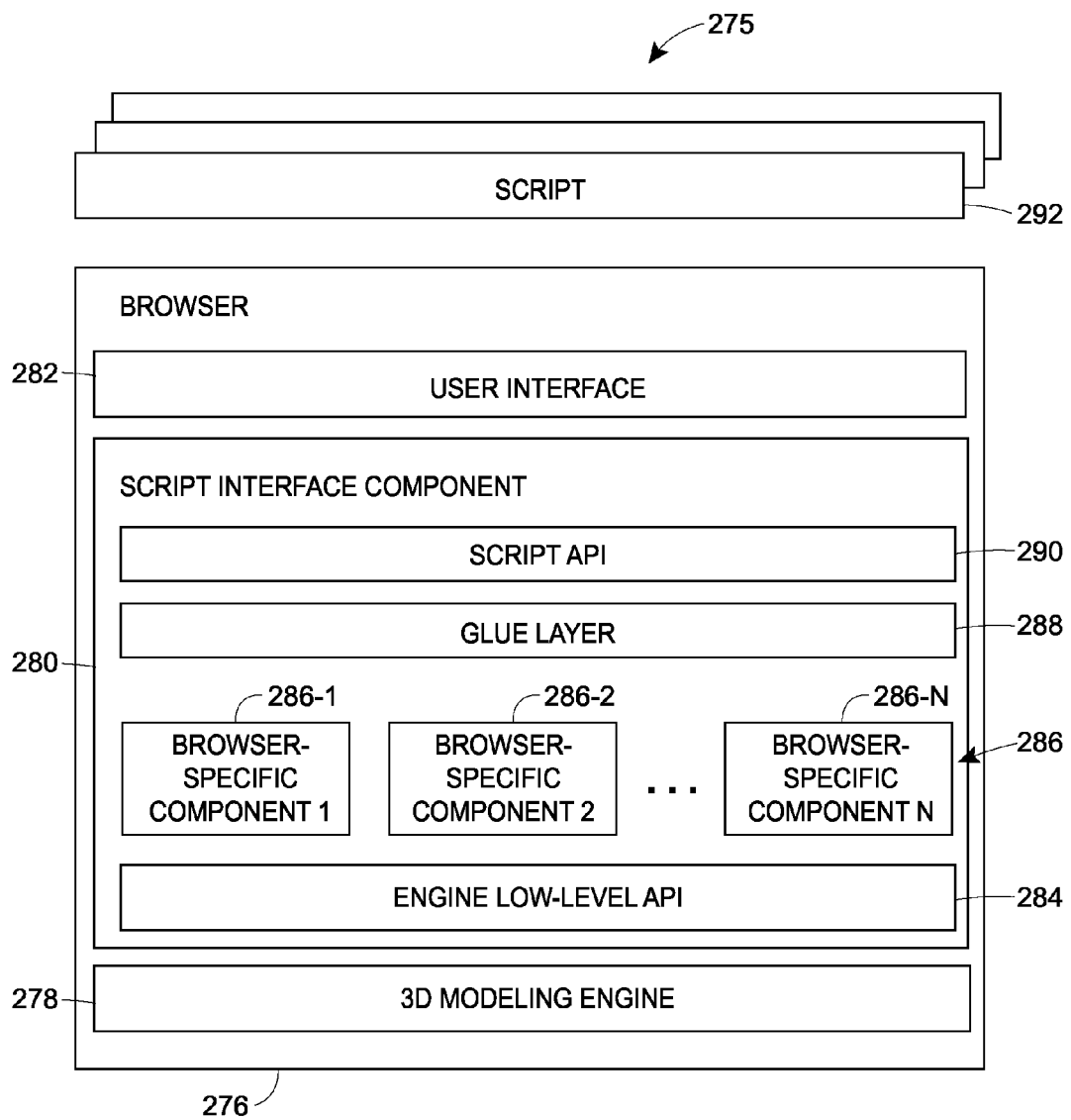
FIG. 2C is a high-level block diagram of still another example computing environment that can be implemented in a client device of FIG. 1.

FIGS. 2A-C illustrate examples of a computing environment in which a 3D modeling software module and scripting interface layer may operate as a modeling client in a browser application. The client device 102 of FIG. 1 may implement the computing environment of any of FIGS. 2A-C or a suitable combination of these environments.

With reference to FIG. 2A, a computing environment 200 may include an operating system 202, which may be any suitable operating system such as Android, Windows, Linux, Mac OS, Android, iOS etc. In general, the operating system 110 may include functions and support drivers for scheduling and executing tasks, obtaining memory resources, accessing the file system as well as input devices, output devices, display devices, and other peripheral devices, exchanging messages between tasks, etc. The operating system 202 may include networking functions 204 to support wired and/or wireless communications with other network devices. For example, the networking functions 204 may include device drivers to support network cards or other network interface modules, such as the network interface 126 illustrated in FIG. 1, for example.

In the computing environment 200, a browser application 206 executes on the operating system 202 to provide browser functionality, which may include core browser functionality, user interface features and, optionally, one or several additional features such as playback of certain multimedia content, for example. Generally speaking, core browser functionality may include messaging according to such communication protocols as Internet Protocol (IP), Transmission Control Protocol (TCP), User Datagram Protocol (UDP), Secure Socket Layer (SSL), and Hypertext Transfer Protocol (HTTP), parsing of content provided in a mark-up language (e.g., Hypertext Markup Language or HTML) and scripts provided in a scripting language (e.g., JavaScript), authentication, management of digital certificates for SSL communications, caching web content and managing the cache, etc. In other embodiments, however, at least some of the messaging functionality may be provided by the operating system 202 (e.g., by the networking functions 204). Further, depending on the implementation, the core browser functionality may include rendering images provided in a standard image format such as BMP, JPEG, or GIF, for example, as well as playing back audio files or feeds and displaying video content provided in respective audio and video formats. An interface 208 for a modeling client 210 may be implemented as a component of the browser 206. The browser interface 208 may allow a user to interact with functions of a modeling client 210 to create and edit scripts 116, specify target hosts and resources, view the rendered content, select links, control interactive content, etc. The browser 206 and interface 208 may also use functions provided by the operating system 202 for generating viewing windows, displaying user controls, processing events related to the displayed user controls, etc.

The modeling client 210 may be provided as a plugin that extends the functionality of the browser 206. A modeling client 210 may include a scripting Application Programming Interface (API) 212 and a modeling engine 214. In particular, the modeling client 210 may include compiled code with functions that may be invoked by the browser 206. The modeling client 210 can be installed in the computing environment 200 only after a user of the corresponding computing device agrees to the terms of use of the modeling client 210. The modeling client 210 may correspond to the 3D modeling software module 152, and may be provided by the modeling server 106 to the client device 102 in response to a request from the client device 102.

The modeling client 210 may include a modeling engine 212 and a scripting component 214. In one embodiment, the browser interface 208 receives events and data from, and provides content to, the browser module 206. For example, the browser interface 208 may receive keyboard events, mouse click events, touch screen gesture events, voice commands, packets received from network devices via the network functions 204, relevant events of the OS 202, etc. The browser interface 208 may provide data such as a raster image of a 3D model to the browser module 206, route events originating in the modeling client 210 to the browser 206, permit a user to create and edit a script 116, etc. In general, the browser interface 208 may facilitate various interactions between the browser 206, the modeling client 210 and a scripting API, as described herein.

The modeling engine 212 interprets model data to generate a raster image of the corresponding 3D model, creates new components in response to commands received via the browser interface 208, modifies model data to add, remove, resize, retexture, and otherwise update selected components, and provides other functionality for developing 3D models. Using the interface 208 to interact with the modeling engine 212, a user may generate and position 3D shapes (and, in some cases, 2D shapes), apply colors and/or textures to various shapes, move, scale, rotate, and skew the shapes, group shapes to define aggregate model components, etc.

The scripting API 212 provides an interface via which certain functionality and data structures of the modeling client 210 are made accessible to other programs, so that the functionality of the modeling client 210 can be extended to include additional features. The interface provided by the scripting API 210 may be consistent with a scripting language supported by the browser application 206 and the browser application 206 may include a script interpreter 216 to interpret, at runtime, and execute instructions in a scripting language. For example, in an embodiment, the browser 206 and the scripting API 212 support Javascript instructions.

A collaboration function 218 may allow users to select various mechanisms for resolving or preventing conflicts between concurrent edits of models 112 and scripts 116. Users may select the desired mechanisms programmatically, for example, via additional scripts compatible with the script-based collaboration function 218. In an embodiment, the collaboration function 218 includes a locking function to lock the model or a component of the model or a script so as to reserve the model/script or the component for editing. In response to a user activating the locking function, the collaboration function 218 may generate a locking notification to notify one or more client devices that the script/component has been locked. Various other functions may allow client devices to modify the same script/component in parallel without locking the component and allow users to select various mechanisms for resolving or preventing conflicts between concurrent edits.

Each of the components 200-214 may be provided as a respective set of compiled instructions within the modeling client 210. In another embodiment, the modeling client 210 initially may be provided with the modeling engine 214 and interface module 208, and the collaboration function 218 may be provided in the form of additional compiled instructions in response to a separate request from the client device.

FIG. 2B illustrates a computing environment 250 that includes an operating system 252 with networking functions 254, a browser 256 including a script interpreter 258, and several 3D modeling components provided as respective scripts interpretable by the script interpreter 258 at runtime. In particular, the computing environment 250 includes an interface 260, a collaboration function 262, and a modeling engine 264 (generally similar to the components 208, 218, and 214, respectively), each provided in a scripting language. In an embodiment, the components 250-264 are provided separately, so that the user need not download any of the particular modules or functions unless he or she wishes to extend the modeling system with those functions.

FIG. 2C illustrates an example client-side 3D modeling sub-system 275 that may be implemented in the client device 102 of FIG. 1. As another example, the modeling client device 210 and the browser 206 of FIG. 2A may be implemented similar to the 3D modeling sub-system 275.

The 3D modeling sub-system 275 includes a browser application 276 in which a 3D modeling engine 278 may operate as a plugin implemented, at least partially, as a set of compiled instructions. The 3D modeling engine 278 may be provided as a dynamic link library (DLL), for example. Typically, the functions of the 3D modeling engine 278 may execute at the same speed as the browser application 276. Moreover, the 3D modeling engine 278 may be provided as a file stored in a predefined location which the browser application 276 always queries upon launch to detect the presence of, and automatically load, files conforming to a certain format.

The 3D modeling engine 278 may be platform-specific and can be provided in different formats for different operating systems. In some embodiments, the 3D modeling engine 278 utilizes graphics functions provided as a part of the browser application 276 or externally to the browser application 276. For example, the 3D modeling engine 278 may use cross-platform APIs for efficiently rendering graphics such as OpenGL®. More specifically, the 3D modeling engine 278 may interpret model data, which may include descriptions of various 3D and/or 2D shapes that make up the corresponding 3D model (stored in any suitable format including a proprietary format defined specifically for 3D model data), and invoke various functions of the OpenGL API for drawing lines, points, and other basic primitives to efficiently generate raster images. The OpenGL API in turn may utilize the available graphics hardware, such a GPU, transparently to the 3D modeling engine 278. In response to receiving a user interface event from the browser application 276 indicating that the 3D model is to be rotated, the 3D modeling engine 278 may re-interpret the model data to determine which combination of geometric primitives describes the new perspective view of the 3D model, and invoke the corresponding OpenGL functions. In addition to interpreting model data, the 3D modeling engine 278 may provide functionality similar to that of the modeling engine described in relation to FIGS. 2A and 2B, above.

The 3D modeling sub-system 275 also may include a script interface component 280 to facilitate the interaction of the 3D modeling engine 278 with the user interface module 282 of the browser application 276 and provide a framework for efficiently adding extensions to the available 3D modeling functionality. More specifically, the script interface component 280 may include a low-level engine API 284, one or several browser-specific components 286, a glue layer 288, and a script API 290. The browser-specific components 286 may include, for example, an ActiveX® component 286-1 configured to wrap, or operate as a proxy for, the functions of the 3D modeling engine 278 so as to operate specifically in an ActiveX framework if the browser application 276 is a Microsoft Explorer browser or a compatible application. As another example, the component 286-2 may be a Netscape Plugin Application Programming Interface (NPAPI) component. Depending on the implementation of the browser application 276, one of the browser-specific components 286 may be active when 3D modeling functionality of the modeling sub-system 275 is invoked, while the other browser-specific components 286 may remain inactive.

The low-level engine API 284 provides an interface between the 3D browser-specific components 286 and the 3D modeling engine 278, so that the same 3D modeling engine 278 can be used in multiple (or all) browser applications, which in some cases are provided by different manufacturers. For example, in an embodiment, the same 3D modeling engine 312 can be used in a Microsoft Explorer, Mozilla Firefox, Safari, or a Google Chrome browser application 276, and a respective one of the browser-specific components 286 makes the 3D modeling engine 278 compatible with the corresponding framework via the low-level engine API 284.

The glue layer 288 may be implemented in an Interface Description Language (IDL), for example, to bridge browser-specific components 286 with the script API 290, which provides access to at least some functions of the 3D modeling engine 278 (and, in some cases, other functions exposed by the browser application 276) via a scripting language interpretable by the browser application 276 at runtime. The script API 290 may be provided in JavaScript, for example. Generally speaking, the script API 290 allows users to efficiently extend, customize, and configure the 3D modeling engine 278 via various scripts 292.

In an embodiment, 3D modeling engine 278 includes collaborative functionality. In another embodiment, however, the 3D modeling engine 278 does not include collaborative functionality, and the script API 290 is used to add collaborative functionality to the 3D modeling sub-system 275 via one of the scripts 292. For example, referring back to FIG. 2A, the scripting API 212 in the computing environment 200 may be similar to the script API 290, and the collaboration function 218 may be developed as discussed above to add collaborative functionality to the modeling engine 214. In yet another embodiment, the 3D modeling engine 278 provides several different mechanisms that can be used for collaborative modeling on a communication network, and the script API 290 is used by one of the scripts 292 to select and access the desired mechanism.

The user interface module 282 may define user interface functions for 3D modeling in the browser application 276. More specifically, the user interface module 282 may provide functions for manipulating objects (e.g., drag, drop, highlight) within a window which the browser application 276 allocates and controls for 3D modeling. Further, the user interface module 282 may provide various interactive controls displayed within the window. These interactive controls may be, for example, icons on which a user may click to select stock objects, texture or color objects, rotate objects, scale objects, etc. The user interface module 282 may also include functions to author a script 116, 292 within a window of the browser. The script 116, 292 may include instructions that also manipulate or create objects using the 3D modeling engine 278. For example, the script instructions may cause the modeling engine to interpret model data to determine a combination of geometric primitives and invoke a corresponding OpenGL function to make changes to the displayed model. The user interface module 282 may also use a function of a script 292 to access another function of the 3D modeling engine 278 to add an interactive control within the window. These scripts 292 may define JavaScript functions that implement various interactive controls and functions of the 3D modeling engine 278 to draw, format, or edit components of a 3D model. The user interface module 282 may be implemented using a suitable Software Development Kit (SDK) for developing front-end scripts, such as Asynchronous JavaScript and XML (AJAX) instructions, that run on different types of browser applications. In an embodiment, the user interface module 282 is implemented using Google Web Toolkit (GWT).

The devices discussed above may be used to provide extensible functionality to a web-based 3D modeling system. While the extension of the web-based modeling system is discussed below in relation to 3D models, these or similar techniques also may be applied to 2D drawings and other types of data. For ease of explanation, the scenario is discussed with reference to the client device 102 and the modeling server 106 of FIG. 1.

Figure 3:
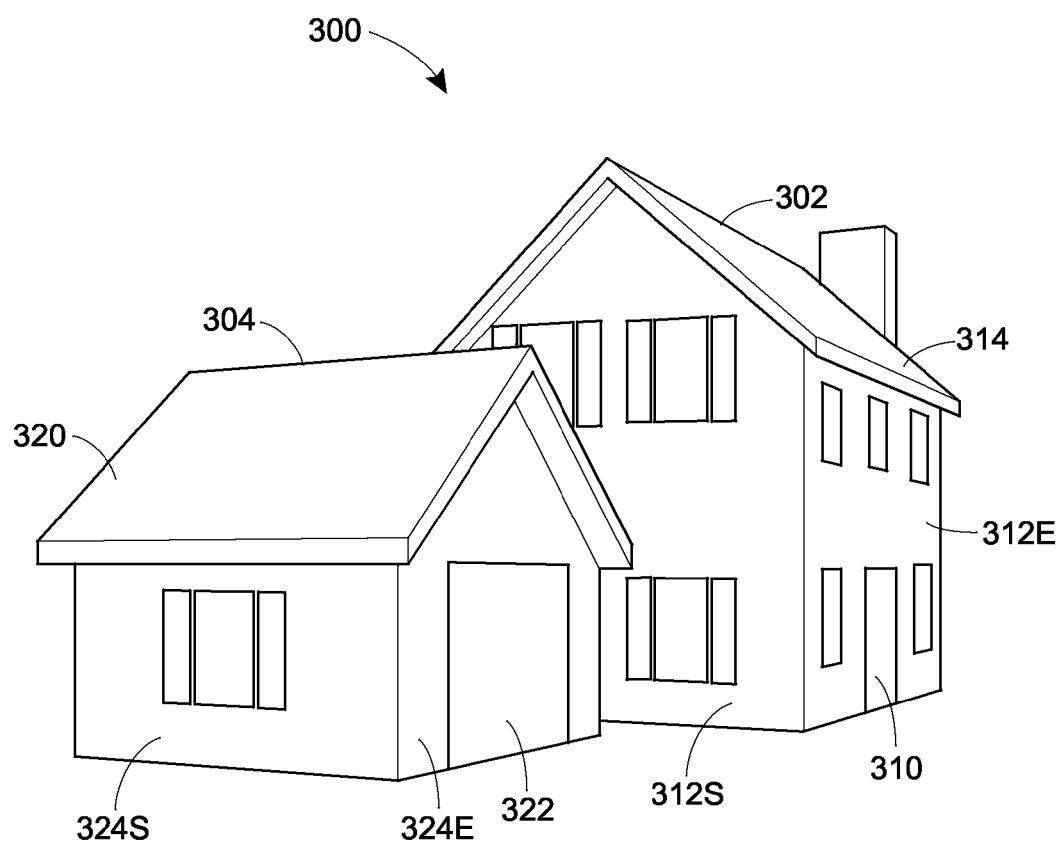
FIG. 3 illustrates an example model which a user operating a client device of the communication system of FIG. 1 may develop.

According to an example scenario, user Abby operating the client device 102 begins to develop a 3D model 300 as illustrated in FIG. 3. The model 300 may include a house component 302 and a garage component 304. Each of the components 302 and 304 in turn may include several sub-components. For example, the house component 302 includes a door 310, walls including a southern wall 312S, an eastern wall 312E, and a roof 314. A garage component 304 may include a roof 330, a door 322, and walls including a southern wall 312S and an eastern wall 312E. The model 300 may also include other components such as windows and a chimney. According to one embodiment, each of the components illustrated in FIG. 3 is made up of one or more elements such as 3D geographic shapes: cuboids, spheres, pyramids, etc. In another embodiment, the components of FIG. 3 may be generated using groups of two-dimensional faces: squares, circles, triangles, etc.

The modeling client 102 may generate components of the model 300 using the web-based 3D modeling system 100 according to commands received from user Abby. For example, to draw the roof 320, Abby may draw multiple shapes and group the shapes using the user interface of the modeling client 102 (e.g., by selecting several shapes with a mouse and activating an icon for generating a group of selected shapes). In general, a model can have nested components at multiple levels. For example, Abby may group several shapes to define a window frame component, then group the window frame component with several 3D shapes to define a window component, create several instances of the window component and group these several instances into a larger "multiple windows" component, etc.

Figure 4:
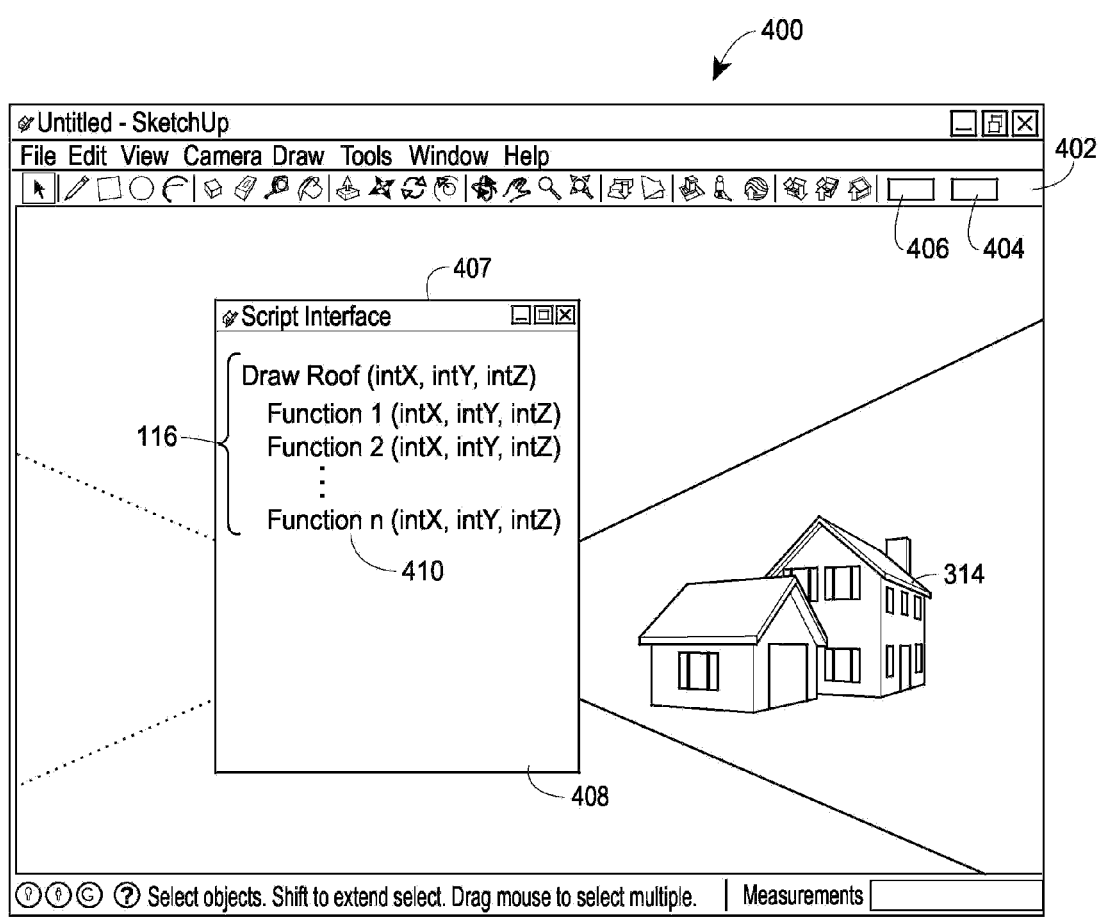
FIG. 4 is an example user interface for the 3D modeling software module including a script authoring interface.

The script interface layer 154 may allow a user to define a script 116 including instructions that, via the script interface layer 154, call functions of the 3D modeling software module 152 to provide additional functionality to the module 152 and the web-based 3D modeling system 100, generally. With reference to FIG. 4, the scripts 116 may be related to various user controls, drawing functions, application skins, etc., as represented by various icons 402 within a user interface 400 for the web-based 3D modeling system 100. In some embodiments, a user may define a script 116 that combines components as groups including multiple 3D shapes (and possibly other components) and then generate multiple instances of the defined component. For example, an interactive control 406 may cause the browser 150 to interpret instructions that instantiate a script interface window 407. The window 407 may provide the user with a text area 408 to author a script 116 that includes method and functions 410 of the 3D modeling engine plug-in (e.g., 152, 210, 264, 278) as exposed via the script interface layer/API 154, 212, 290 (and 708A, 708B of FIG. 7 as described herein). One example of a script 116 defined by the user may include JavaScript instructions to draw a roof component (e.g., roof 314 of FIG. 3) and an icon 404 as an interactive control corresponding to the script 116. When a user selects the interactive control icon 404 corresponding to the script 116, the instructions of the script may cause the processor 118 (via the browser 276) to execute/interpret instructions of the script 116 and draw the roof component 314. In further embodiments, when a user later edits an instance of a script or a component, the changes are automatically applied to other instances.

Figure 5:
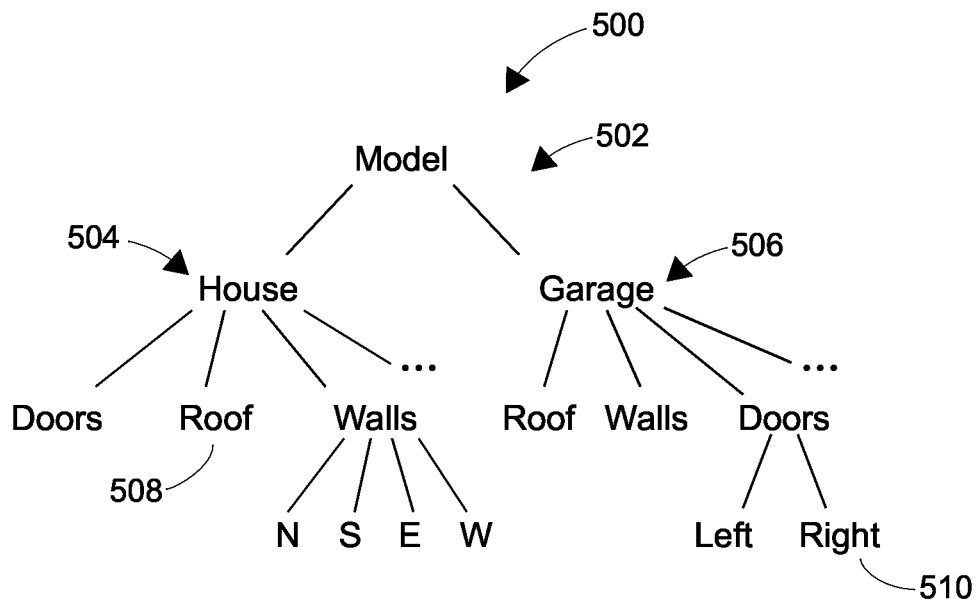
FIG. 5 is an example data structure for a 3D model.

FIG. 5 is a schematic diagram of an example data structure 500 corresponding to the model 300, which the modeling client 210 and engines 214, 264 may generate when user Abby groups the shapes in the manner outlined above. After Abby creates the model 300, the modeling client 210 and engines 214, 264 may initially store model data 124A including the data structure 500 in the data storage 124. The data structure 500 includes a root node 502, a house branch 504, and a garage branch 506. Each of the branches 502 and 506 stores a particular component of the model 500. Further, the house branch 504 includes a roof branch 508 that corresponds to the roof component 314 as well as other branches corresponding to other components (a doors component, a walls component, etc.). The roof component 314 or any other components may have been created by executing/interpreting a script 116. As can be seen in FIG. 5, the garage branch 506 includes, among other branches, a doors branch with a right-door branch 510 that corresponds to the component 322. The right-door branch 510 may specify the component 322 as a set of 3D shapes, texture and/or color information, animation data, and other data. In general, a component may include drawing data, non-drawing data (text labels, metadata), and other components that also may include drawing and non-drawing data. In addition to the data structure 500, the model data 124A and 112 may include other information (e.g., metadata) such as timestamp information, user information, etc.

In an embodiment, the modeling client 152 utilizes the data structure 500 to represent a selected component of the model 300 in a serialized format. Generally speaking, by generating a serialized representation a component branch, a device operating in a collaborative development environment permits another device, such as a client device or a modeling server, to properly resolve conflicts and address collisions between modifications submitted at several devices. A serialized representation and operational transformation (OT) techniques may allow client devices to modify the same component in parallel without locking the component. A serialized representation of a branch may include a sequence of basic 3D shapes (cuboids, spheres, etc.) that make up the corresponding component.

A script 116 may be developed collaboratively, as well. If two users collaboratively edit version V of a line of the script 116, such as "function drawRoof (int x, int y, int z)" modifications to the script 116 may be expressed as text editing commands (e.g., insert, delete, replace, etc.) applied at specific character positions within the script. For example, a first user may wish to replace the word "draw" in the tenth through thirteenth bytes of the line with the word "create." A second user may wish to insert the world "string q" following the nineteenth byte of the line according to the same version V of the line. If the command from the first user is applied to the line before the second user modification, the unmodified command from the second user is then applied to the wrong portion of the line. However, the commands from the first user and the second user can be easily reconciled by modifying the index at which the new word is to be inserted. In fact, in the example above, regardless of the order in which the two users submit modifications to the line, the conflict between the two commands is easily resolved, if the version V to which the corresponding command is applied is known. Thus, modifications to documents in which data is represented linearly (e.g., JavaScript text documents) or in terms of numbered cells (e.g., spreadsheets) can be concurrently performed using indexing relative to a known version of the document. It is noted that this approach is compatible with lock-based as well as lock-free collaborative development.

The modeling client 152 may provide a library of functions which may be invoked by the browser 150 at runtime by various scripts 116 that are authored by a user or users, managed by the extensions manager 156, and stored in a remote database 114. The scripts extend the modeling client's 152 basic library of functions. A script API 212, 290 may extend the functionality of the corresponding 3D modeling engine 214. In an embodiment, the modeling client 152 also exposes a library of collaboration functions via a collaboration API. The collaboration API may be provided as a component of the scripting API 212, 290. The library of functions may include, for example, a drawBox function to generate a first type of basic shape and a drawCircle function to generate a second type of basic shape, and a group geometry function to group the 3D shapes under the root node, etc. Users may then use the scripting API 212, 290 to develop a script 116 that uses several of the basic functions to create a component includes several basic 3D shapes. The developed script 116 may also be associated with an interactive control such as the icon 404. At runtime, the icon 404 may be displayed within the user interface 400. A user may select the icon 404 associated with the script 116 and cause the browser 150 to execute/interpret the functions described in the developed script 116.

In an embodiment, the collaboration API provides a transform function which a script or a compiled program may invoke with a parameter list that includes the identifier of an entity (e.g., a component, an element such as a 3D basic shape, etc.), a transformation operation selected from a predefined list (e.g., translate, rotate, scale), and a user identifier. The collaboration API also provides a new_component function to add a definition and/or an instance of a component under the root node 452. The new_component function may be invoked with a definition of the new component, a user identifier, and a component identifier. Also, the collaboration API may include functions start_edit, edit, and end_edit, which the corresponding script invokes when a user begins to edit a component, edits the components, and completes editing the component, respectively. In an embodiment, invoking the function start_edit causes the collaboration API to automatically lock the component, and invoking the function end_edit causes the collaboration API to automatically unlock the component.

Figure 6:
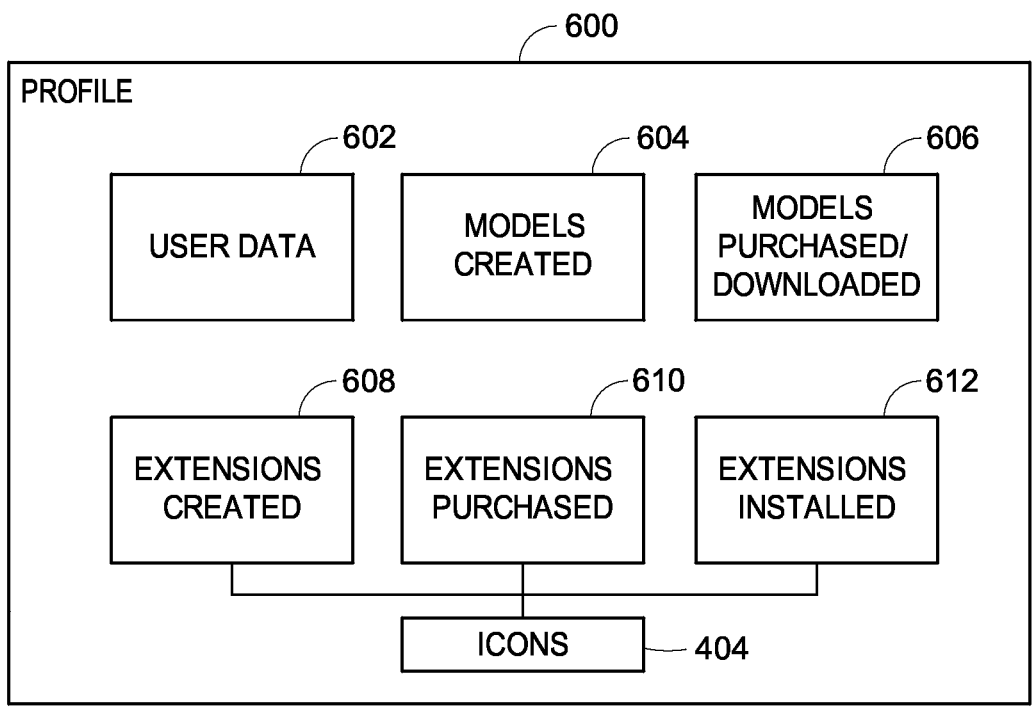
FIG. 6 is an example data structure for a user profile corresponding to a user of the 3D modeling software module.

FIG. 6 is a block diagram representing an exemplary user profile 600 managed by the profile manager 160 (FIG. 1). In an embodiment, the profile 600 includes user data 602. The user data 602 may include personal information about the user, including the user's name, address, phone number, information about client devices associated with the user, etc. In an embodiment, the modeling software and/or one or more script extensions 116 associated with the modeling software and/or one or more models associated with the modeling software may be available according a subscription model. The subscription model may allow various service levels related to functionality of the modeling software, availability of updates, availability of one or more scripts, etc., according to the status of users as subscribers. Accordingly, the user data 602 may also include subscription data, indicating the user's subscription status (i.e., whether the user has a subscription, the type of subscription, when the subscription expires, etc.). The user data 602 may further include payment information, such as credit card information, used for subscription purposes and/or to purchase models 112 and/or scripts 116, in an embodiment.

The profile 600 may also include data 604 about models the user has created, and data 606 about models the user has purchased and/or downloaded. For example, a user may have unrestricted rights to download, edit, and/or share models that the user created, which models are identified in the data 604. Additionally, in an embodiment, the user may choose the rights associated with any particular model 112 that the user created, and the rights associated with each model 112 created by the user may be recorded in the data 604. The data 606, by comparison, may include records related to models 112 that the user has purchased from, for example, an online marketplace of models, or records related to models 112 that user has downloaded or to which the user has been given rights by the model's creator.

Of course, the profile 600 also includes data 608, 610, and 612 related to the scripts 116. For example, the profile 600 includes data 608 related to scripts created by the user. Like the models indicated by the data 604, the scripts indicated in the data 608 may be downloadable, editable, or sharable by the user because the user created the scripts. In an embodiment, the user may choose the rights associated with a particular script 116 that the user created, and the rights associated with each script 116 created by the user may be recorded in the data 608. The data 610 may record scripts 116 that the user has purchased, in embodiments implementing a marketplace for scripts (i.e., a means for users to buy and/or sell scripts 116).

It is not always necessary or desirable, however, for a user to have installed all of the scripts 116 that the user created (e.g., the scripts 116 indicated in the data 608) or the scripts 116 that the user downloaded and/or purchased (e.g., the scripts 116 indicated in the data 610). For example, a user may create an script 116 solely for the purpose of selling it or making it otherwise available to other users, without the user choosing to install the script 116 on the device on which the user runs the 3D modeling application. For this reason, in an embodiment the profile 600 additionally includes data 612 indicating scripts 116 that are currently installed on the user's client device. Thus, any particular script 116 may be indicated in the data 608 as created by the user, but not indicated in the data 612 as installed to run on the user's client device. As a result, a user may experience a seamless transition between experiences on multiple client devices. That is, the user may install one or more scripts 116 to run with the client on the user's tablet computer (e.g., the client device 102), and the scripts may be automatically installed to run with the client on the user's desktop computer (e.g., the client device 14) upon the user logging into the user's profile.

Figure 7:
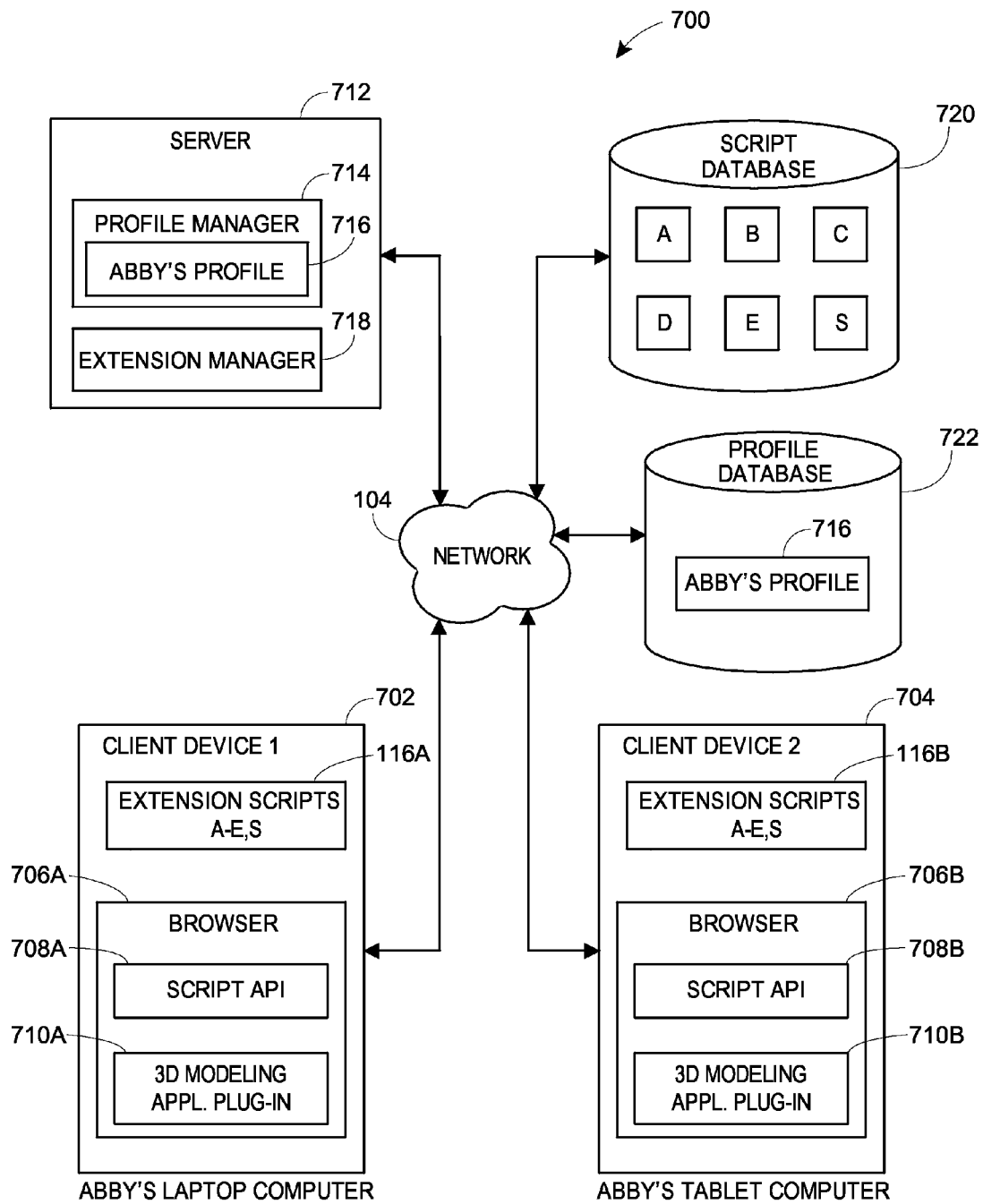
FIG. 7 is a high-level block diagram of an example computing environment implemented in two client devices to collaboratively develop a script to extend the functionality of the web-based, 3D modeling system.

FIG. 7 depicts a block diagram of an embodiment 700 of the system 100. A user, Abby, has as the first client device 702 a laptop computer and as the second client device 704 a tablet computer. The laptop computer 702 has installed on it browser software 706A, which is configured to run an installed 3D modeling application plug-in 710A, and an installed scripting API 708A for exposing functions of the 3D modeling plug-in 710A to develop various scripts 116 that may be executed/interpreted by the browser 706A. Abby may enter her identification and authentication information into an interface of the plug-in 710A. The information may be transmitted from the laptop 702 to the server 712 and, in particular to the profile manager 714, which may receive the identification and authentication information and associate the laptop 702 with a profile 716 for Abby. Abby may execute a command associated with the plug-in 710A to contact the extension manager 718 on the server 712, and search for, download, and install a collection of extension scripts A, B, C, D, and E from the script database 720. The extensions A-E may be stored as scripts 116A on the laptop computer 702. Upon downloading the extension scripts A-E, the extension manager 718 may instruct the profile manager 714 to update Abby's profile 716 to indicate (e.g., in the data 602) that Abby has downloaded the extensions A-E and to indicate (e.g., in the data 612) that Abby has installed the extensions A-E.

Abby may also create an extension S, which may also be stored as one of the extension scripts 116A on the laptop computer 702. In some embodiments, the user may select the interactive control 406 (FIG. 4) to display the script interface window 407 within the interface 400. After creating the extension S, Abby may activate a control in the 3D modeling application plug-in 710A to upload the extension S to the extension database 720. Accordingly, the software may contact the extension manager 718 via the network 104 and may transmit the extension S to the server 712 for storage in the database 720. The extension manager 718 may instruct the profile manager 714 to update Abby's profile 716 to indicate (e.g., in the data 608) that Abby has uploaded the extension S. If Abby installs the extension S on the laptop computer 702, the extension manager 718 may instruct the profile manager 714 to update Abby's profile to indicate (e.g., in the data 612) that Abby has installed the extension S. At the end of Abby's session using the laptop computer 702 (or after a time period, or immediately) the profile manager 714 may update Abby's profile 716 in the profile database 722.

Later, Abby may use her tablet computer 704. The tablet computer 704 has installed on it browser software 706B, which is configured to run an installed 3D modeling application plug-in 710B, and an installed script API 708B for exposing functions of the 3D modeling plug-in 710B to develop various scripts 116 that may be executed/interpreted by the browser 706B. Abby may enter her identification and authentication information into an interface of the plug-in 710B. The information may be transmitted from the tablet 704 to the server 712 and, in particular to the profile manager 714, which may receive the identification and authentication information and associate the tablet computer 702 with Abby's profile 716. The profile manager 714 may read the data 612 indicating that Abby has previously installed extensions A-E and S. In an embodiment, the profile manager 714 may request from the tablet computer 702 data indicating scripts 116B installed on the tablet computer, and may instruct the extension manager 718 to transmit to the tablet computer 702 any extensions indicated in the data 612 but not installed on the tablet computer 702. In another embodiment, the profile manager may send to the tablet computer 702 a list of extensions indicated in the data 612, and the tablet computer 702 may send a request for extensions not present among the extensions 116B. In response to the request, the extension manager 718 may transmit to the tablet computer 704 the requested extensions. For example, when Abby begins using the tablet computer 704, the scripts 116B may include only the extension A. Upon receiving the data 612 from the profile manager 714 (indicating that extensions A-E and S are installed), the tablet computer 704 may request extensions B-E and S from the extension manager 718. Some or all of this process may occur without any intervention by Abby. That is, the process may be automatic and transparent to the user. In further embodiments, the extensions 116 may be shared with other users through the script 720 database via the network 104.

Figure 8A:
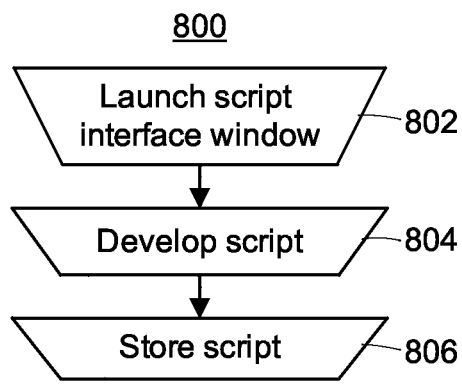
FIG. 8A a flow diagram of an example method for extending the functionality of the web-based, 3D modeling system.

FIG. 8A is a flow diagram of an example method 800 for creating and uploading scripts 116 that extend the functionality of a 3D web-based modeling system 100 generally, and a web-based 3D modeling engine browser, in particular. The method 800 may include one or more blocks, modules, functions or routines in the form of computer-executable instructions that are stored in a tangible computer-readable medium and executed using a processor 118 of the client device 102, 702, 704 (e.g., a personal computer, a smart phone, tablet computer, or a mobile computing device, or other personal computing device, as described herein). The method 800 may be included as part of any modules of a computing environment for a web-based 3D modeling system 100, 700, or as part of a module that is external to such a system. For example, the method 800 may be part of a 3D modeling browser plug-in (e.g., 152, 210, 264, 278), a backend server 106, 712, a script interface layer/API 154, 212, 290, 708A, 708B, the extensions manager 156, the scripting engine 108, a script interpreter 216, 258, or any other module or component. The method 800 may execute at the client device 102, 702, 704 as interpreted by a browser 150, 206, 256, 276, 706A, 706B, at a server 106, 712, or any combination of the client(s) and server(s). Further, a user may activate or disable one or more functions to restrict or prevent the system 100, 700 from collecting and personal data from the user. For example, a user interface may present an interactive control to allow a user to opt-in or opt-out of any user personal data collection. FIG. 8A will be described with reference to FIGS. 1-7 for ease of explanation, but the method 800 may of course be utilized with other objects and user interfaces.

At block 802, an interactive control 406 may cause a browser 150, 206, 256, 276, 706A, 706B to execute/interpret instructions that instantiate the script interface window 407 within a user interface 400. The window 407 may provide an interface for the user with the classes and methods of the 3D modeling engine 152, 210, 264, 278 that are exposed through the script interface layer/API 154, 212, 290, 708A, 708B. At block 804, a user may develop a script 116. The script may include methods from classes exposed via the script interface layer/API 154, 212, 290, 708A, 708B. In some embodiments, the exposed classes include methods to draw basic shapes (e.g., a cube, cylinder, sphere, etc.) as well as methods to combine the shapes into a composite shape, add textures and skins to the shapes, etc. A script 116 may include a combination of several functions 410 that are exposed to a user in the window 407 via the script interface layer/API 154, 212, 290, 708A, 708B. At block 806, the method 800 may execute instructions to store the developed script 116 in a backend database of the modeling system 100. In some embodiments, the method 800 may execute instructions to cause the developed script to be communicated to the script database 114 via the network 104. In other embodiments, the method 800 may store the developed script 116 locally within the client 102 within a data storage component 124 such as the model/script data storage are 142A.

Figure 8B:
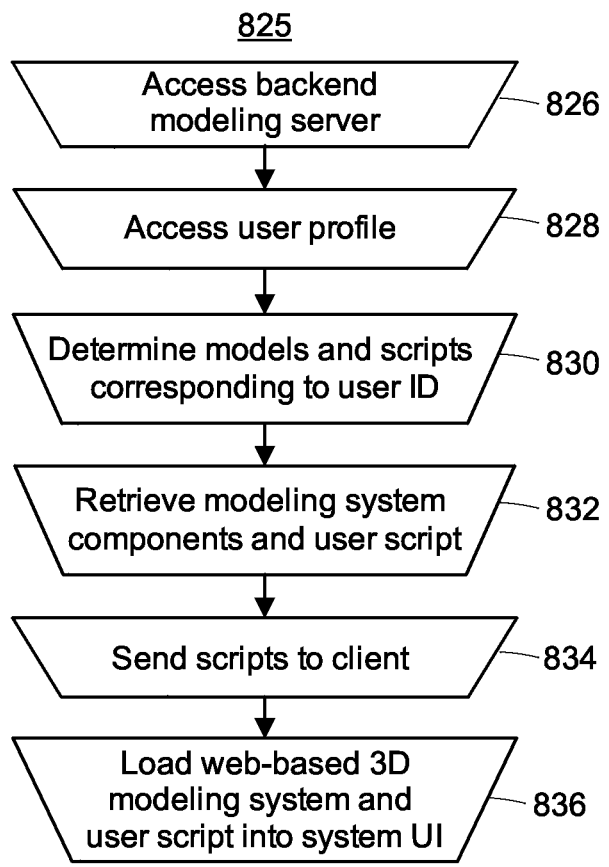
FIG. 8B is another flow diagram of an example method for extending the functionality of the web-based, 3D modeling system.

FIG. 8B is a flow diagram of an example method 825 for modifying a user interface for a web-based 3D modeling system to make developed scripts 116 available to a user of the system 100. The method 825 may include one or more blocks, modules, functions or routines in the form of computer-executable instructions that are stored in a tangible computer-readable medium and executed using a processor 118 of the client device 102, 702, 704 (e.g., a personal computer, a smart phone, tablet computer, or a mobile computing device, or other personal computing device, as described herein). The method 825 may be included as part of any modules of a computing environment for a web-based 3D modeling system 100, 700, or as part of a module that is external to such a system. For example, the method 825 may be part of a 3D modeling browser plug-in (e.g., 152, 210, 264, 278), a backend server 106, 712, a script interface layer/API 154, 212, 290, 708A, 708B, the extensions manager 156, the scripting engine 108, a script interpreter 216, 258, or any other module or component. The method 825 may execute at the client device 102, 702, 704 as interpreted by a browser 150, 206, 256, 276, 706A, 706B, at a server 106, 712, or any combination of the client(s) and server(s). Further, a user may activate or disable one or more functions to restrict or prevent the system 100, 700 from collecting and personal data from the user. For example, a user interface may present an interactive control to allow a user to opt-in or opt-out of any user personal data collection. While FIG. 8B will be described with reference to FIGS. 1-7 for ease of explanation, but the method 825 may of course be utilized with other objects and user interfaces.

At block 826, an interactive control may cause the browser 150, 206, 256, 276, 706A, 706B to access the modeling server 106 via the network 104. As described above in relation to FIGS. 2A, 2B, and 2C, the 3D Modeling System components (i.e., a modeling client 210, modeling engine 264, 278) may be requested by the browser as a plug-in component for the browser. In some embodiments, login information may be provided to the backend server 106, 712 in order to access the server(s) 106, 712 or as the client device requests the 3D Modeling System components 210, 264, 278 from the server(s) 106, 712 to launch the user interface 282 on a client device. At block 828, accessing the backend server for the 3D Modeling System components 210, 264, and 278 may also cause the method 825 to access a user profile 600 corresponding to the login information. As described in relation to FIG. 6, the user profile information may correspond to or be associated with data 608, 610, 612 identifying scripts 116 created, purchased, and installed by the user as well as icons 404 for the scripts 116. At block 830, the method 825 may use the data 608, 610, and 612 to determine which scripts 116 stored within the script database 114 correspond to the data 608, 610, 612. For example, each script 116 may include an identifier or other information that correlates the login information to the script. At block 832, the method 825 may retrieve the scripts 116 corresponding to the login information. In some embodiments, the scripts 116 corresponding to the data 608, 610, 612 are retrieved from the script repository 114 with other 3D Modeling System components (i.e., a modeling client 210, modeling engine 264, 278) that are loaded into the program memory of the client device as a browser plug-in in block 826. In other embodiments, the scripts 116 corresponding to the data 608, 610, 612 are stored locally (e.g., at the client device 102, 702A, 702B) and activated when the 3D Modeling System components 210, 264, 278 are loaded into program memory as a browser plug-in at block 826. At block 834, the method 825 may send the retrieved scripts 116 to the client. The modeling components 210, 264, and 278, may also be sent to the client at bock 834. At block 836, both the modeling components 210, 264, and 278, may be loaded into the program memory 122 as a browser plug-in and the retrieved scripts 116 may be loaded as an extension of the plug-in.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 104, may include but is not limited to any combination of a LAN, a MAN, a WAN, a mobile, a wired or wireless network, a private network, or a virtual private network. Moreover, while only one client device is illustrated in FIG. 1 and two devices 702, 704 are illustrated in FIG. 7 to simplify and clarify the description, it is understood that any number of client computers or display devices are supported and can be in communication with the server 106, 712.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a web-based 3D modeling system for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for providing an extensible framework for web-based 3D modeling through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A tangible non-transitory computer-readable medium storing instructions for three-dimensional (3D) modeling in a browser application that executes on a processor of a computing device, the instructions comprising:
    an interface module that executes on the processor to receive user commands from a text area of the browser application, the user commands defining a script including functions to modify or create one or more components of a 3D model and cause a rendering of the 3D model to be displayed in a window controlled by the browser application;
    a modeling engine that executes on the processor as a compiled plug-in component of the browser application, wherein the modeling engine extends the functionality of the browser application and the modeling engine includes functions to interpret model data corresponding to the 3D model and to render the 3D model in accordance with the script; and
    a script interface layer that executes on the processor to expose the modeling engine functions to the interface module for use by the script functions, wherein the script functions extend the modeling engine functions, and wherein the script is associated with user profile information for a user.

2. The computer-readable medium of claim 1, wherein the script interface layer is a component of the modeling engine.

3. The computer-readable medium of claim 2, wherein the browser application executes on the processor to retrieve the modeling engine including the script interface layer from a backend server.

4. The computer-readable medium of claim 1, wherein the browser application includes a script interpreter that executes on the processor to interpret, at runtime, the script authored using the script interface layer.

5. The computer-readable medium of claim 1, wherein the modeling engine is a dynamic link library (DLL).

6. The computer-readable medium of claim 1, wherein the script includes instructions to cause the modeling engine that executes on the processor to interpret model data to determine a combination of geometric primitives and invoke a corresponding OpenGL function.

7. The computer-readable medium of claim 1, wherein the interface module includes a function that executes on the processor to add an interactive control within a window of the browser application, the interactive control corresponding to the script to draw, format, or edit components of the 3D model.

8. A computing device for extending functions of a 3D modeling system, the computing device comprising:
    a network interface coupled to a communication network;
    a processor;
    a memory coupled to the processor;
    a display device coupled to the processor;
    a browser application stored in the memory that executes on the processor to retrieve content from remote hosts via the communication network interface and render the retrieved content on the display device; and a 3D modeling software module stored in the memory that executes on the processor, the 3D modeling software module including:
an interface module that executes on the processor to receive user commands from a text area of the browser application, the user commands defining a script including functions to modify or create one or more components of a 3D model and cause a rendering of the 3D model to be displayed in a window controlled by the browser application, and wherein the script is associated with user profile information for a user;
a modeling engine module that executes on the processor as a compiled plug-in component of the browser application, wherein the modeling engine module extends the functionality of the browser application and the modeling engine module includes functions that cause the processor to interpret model data corresponding to the 3D model and to render the 3D model on the display device in accordance with the script; and
a script interface layer that executes on the processor to expose the modeling engine functions to the interface module for use by the script functions, wherein the script functions extend the modeling engine module functions, the commands defining the script include functions of the modeling engine module, the user commands defining the script are associated with an interactive control of a user interface of the browser application, and activation of the interactive control causes the processor to execute the user commands defined in the script.

9. The computing device of claim 8, wherein the script interface layer is a component of the modeling engine module.

10. The computing device of claim 8, wherein the modeling engine module is a dynamic link library (DLL).

11. The computing device of claim 8, wherein the script includes instructions that execute on the processor to cause the modeling engine module to interpret model data to determine a combination of geometric primitives and invoke a corresponding OpenGL function.

12. The computing device of claim 8, wherein the interface module includes a function that executes on the processor to add an interactive control within a window of the browser application, the interactive control corresponding to the script to draw, format, or edit components of the 3D model.

13. A method for extending functions of a browser-based, 3D modeling system in a computing device operating on a communication network and having a memory and a processor, the method comprising:

receiving a 3D modeling engine from a backend server at a browser application, the 3D modeling engine received as a compiled plugin including functions to extend the functionality of the browser application, the 3D modeling engine including an interface layer that exposes the 3D modeling engine functions for use by a script;

receiving, via a text area of a user interface of the browser application, a user command for authoring the script, wherein the script includes instructions that refer to the 3D modeling engine functions, and the functions modify respective portions of model data to change one or more of dimensionality, positioning, and color of a 3D model component; and sending the script to a backend database, wherein the script is associated with user profile information for a user and the script is executable to extend the 3D modeling engine functions.

14. The method of claim 13, further comprising associating the script authored in the text area with an interactive control of the user interface, wherein activation of the interactive control causes the processor to execute the script instructions to draw, format, or edit components of a 3D model.

15. The method of claim 13, wherein the script includes instructions that execute on the processor to cause the 3D modeling engine to interpret 3D model data to determine a combination of geometric primitives and invoke a corresponding OpenGL function.

16. The method of claim 13, wherein a script interface layer that executes on the processor to expose the 3D modeling engine is a component of the 3D modeling engine.

17. The method of claim 16, further comprising retrieving, by the browser application, the 3D modeling engine and the script interface layer from the backend server.

18. The method of claim 13, wherein the browser application includes a script interpreter that executes on the processor to interpret, at runtime, the script authored using the script interface layer.

19. The method of claim 13, further comprising associating a version identifier with at least a portion of the script.

20. The method of claim 19, further comprising:
receiving a modification to the script from a second computing device; and
applying the modification to the script, wherein the modification is specific to the version identifier associated with the script.

* * * * *